US010994353B2

(12) United States Patent
Lemay et al.

(10) Patent No.: US 10,994,353 B2
(45) Date of Patent: May 4, 2021

(54) METHOD AND DEVICE FOR LASER SOLDERING AN ELECTRIC CIRCUIT OF A HEATING PORTION OF AN ELECTRONIC CIGARETTE

(71) Applicant: G.D S.p.A., Bologna (IT)

(72) Inventors: Michael Andre Lemay, Bologna (IT); Giovanni Madera, Bologna (IT); Enrico Medina, Bologna (IT); Alessandro Venturi, Casalecchio di Reno (IT); Alexander Shneyder, Bologna (IT); Massimo Sartoni, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 824 days.

(21) Appl. No.: 15/264,817

(22) Filed: Sep. 14, 2016

(65) Prior Publication Data
US 2017/0361389 A1    Dec. 21, 2017

(30) Foreign Application Priority Data

Jun. 15, 2016    (IT) .................. 102016000061613

(51) Int. Cl.
*B23K 1/00*        (2006.01)
*B23K 1/005*       (2006.01)
(Continued)

(52) U.S. Cl.
CPC .......... *B23K 1/0056* (2013.01); *A24F 47/008* (2013.01); *B23K 1/0016* (2013.01);
(Continued)

(58) Field of Classification Search
CPC ............ B23K 1/0056; B23K 26/0622; B23K 1/0016; B23K 1/19; B23K 26/0823; B23K 2101/36; B23K 2101/38; A24F 47/008
(Continued)

(56) References Cited

U.S. PATENT DOCUMENTS 3,622,742 A   11/1971  Cohen et al.
6,602,742 B2 * 8/2003 Maletin ................. H01M 4/583
                                                    438/142
(Continued)

FOREIGN PATENT DOCUMENTS

CN    102684312 A    9/2012
CN    105188429 A    12/2015

OTHER PUBLICATIONS

European Search Report dated Oct. 26, 2017 from counterpart European App No. 17176097.
(Continued)

*Primary Examiner* — Chee-Chong Lee
(74) *Attorney, Agent, or Firm* — Shuttleworth & Ingersoll, PLC; Timothy Klima

(57) ABSTRACT

A laser soldering device for laser soldering an electric circuit of a heating portion of an electronic cigarette, the soldering device including a head having an emitting area where a laser beam is emitted and a feeding device to feed a heating portion of an electronic cigarette along a feed path, where the heating portion faces the head at the emitting area. A movement device is operatively connected to the head to move the head between first and second points of the electric circuit such that the laser beam is perpendicular to the respective surface to be soldered at the first and second points to form first and second connections, respectively. The head generates two distinct pulses of the laser beam at the first and second points.

10 Claims, 4 Drawing Sheets

(51) Int. Cl.
  *B23K 1/19*     (2006.01)
  *B23K 26/0622*  (2014.01)
  *B23K 26/08*    (2014.01)
  *A24F 47/00*    (2020.01)
  *B23K 101/36*   (2006.01)
  *B23K 101/38*   (2006.01)

(52) U.S. Cl.
  CPC ............ *B23K 1/19* (2013.01); *B23K 26/0622* (2015.10); *B23K 26/0823* (2013.01); *B23K 2101/36* (2018.08); *B23K 2101/38* (2018.08)

(58) Field of Classification Search
  USPC ..................................................... 219/121.64

See application file for complete search history.

(56) References Cited

U.S. PATENT DOCUMENTS

| | | | | |
|---|---|---|---|---|
| 7,164,574 | B2* | 1/2007 | Barr | H01G 9/008 |
| | | | | 361/520 |
| 7,474,520 | B2* | 1/2009 | Kashihara | H01G 9/016 |
| | | | | 361/502 |
| 2009/0223940 | A1* | 9/2009 | Hosoya | B23K 15/008 |
| | | | | 219/121.64 |
| 2012/0229954 | A1 | 9/2012 | Lee et al. | |
| 2014/0261495 | A1 | 9/2014 | Novak et al. | |

OTHER PUBLICATIONS

Italian Search Report dated May 18, 2017 for counterpart Italian Application No. IT UA20164388.
Chinese Office Action dated Apr. 23, 2020 from counterpart Chinese App No. 201710442204.4.

* cited by examiner

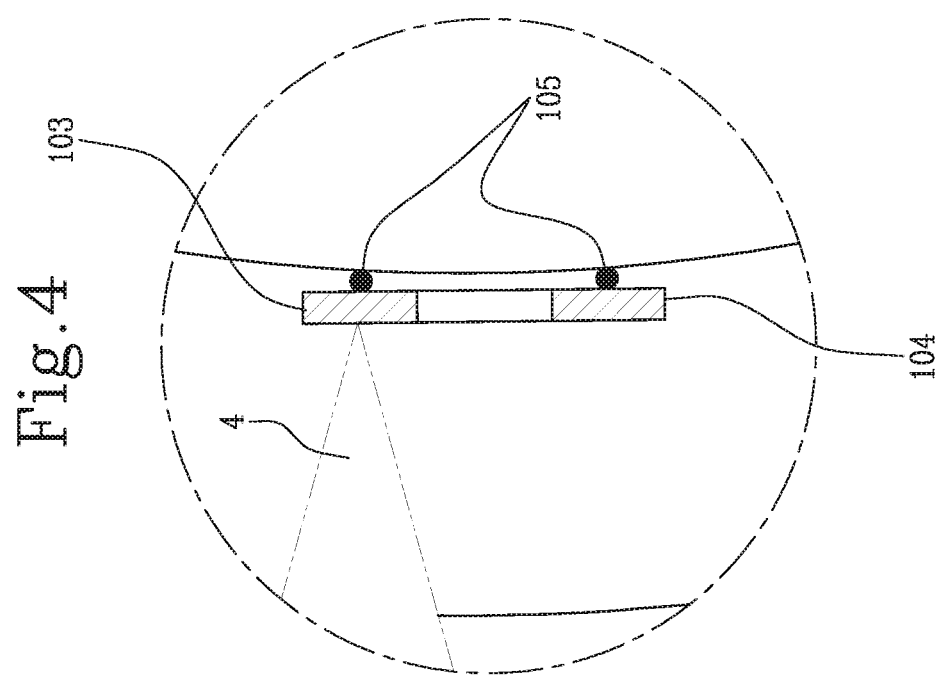

METHOD AND DEVICE FOR LASER SOLDERING AN ELECTRIC CIRCUIT OF A HEATING PORTION OF AN ELECTRONIC CIGARETTE

This application claims priority to Italian Patent Application No. 102016000061613 filed Jun. 15, 2016, the entirety of which is incorporated by reference herein.

BACKGROUND OF THE INVENTION

This invention relates to a method and a device for laser soldering an electric circuit of a heating portion of an electronic cigarette.

More specifically, this invention relates to a laser soldering device used in a machine for making or assembling an electronic cigarette. The invention also relates to a laser soldering method applied in the context of a process for making or assembling an electronic cigarette.

This invention is thus applicable in the sector of electronic cigarette production or assembly.

Electronic cigarettes are known which comprise a heating portion where an electric circuit connected to an energy source, for example a battery, is configured to produce heat by the Joule effect as a result of current flowing through it in order to heat an aromatic substance contained in an aromatic component of the heating portion, thus causing the aromatic substance to evaporate.

To optimize the Joule effect, the electric circuit has two terminals which are placed (or adapted to be placed) in electrical connection with the energy source and a coil wound around the aromatic component.

It is known that laser heads, both traditional and electronic, are used in the production of cigarettes. The laser heads are used to carry out several operations, including laser soldering of the coil to the terminals in a process for making an electronic cigarette.

Since two different solder connections must be made, one at each terminal, a single, fixed laser soldering head is used and the laser beam is deflected between the two solder points by a plurality of mirrors.

This soldering method produces a laser beam which always makes a non-negligible angle with the perpendicular to the surface to be soldered, making it difficult to control the soldering operation and thus negatively affecting the quality of the resulting solder.

These disadvantages are made worse by the reduced transverse dimensions of the coil which is likely to be damaged if struck directly by the laser beam.

SUMMARY OF THE INVENTION

This invention has for an aim to provide a method and a device for laser soldering an electric circuit of a heating portion of an electronic cigarette to overcome the disadvantages mentioned above with reference to the prior art.

More specifically, the aim of this invention is to provide a method and a device for laser soldering an electric circuit of a heating portion of an electronic cigarette and which are capable of maximizing the quality of the solder, especially in the case of the connections between coil and terminals.

Another aim of the invention is to provide a method and a device for laser soldering an electric circuit of a heating portion of an electronic cigarette applicable, respectively, to a machine and a production process operating at high speed.

The above aims are achieved by a method and a device for laser soldering an electric circuit of a heating portion of an electronic cigarette and having the features set out in one or more of the appended claims. The dependent claims correspond to possible embodiments of the invention.

Advantageously, thanks to a laser soldering head which is movable (preferably at constant speed) and to a single laser soldering head which generates two distinct pulses (one for each terminal), it is possible to obtain respective laser beams which are perpendicular to the surfaces to be soldered (with at most very slight deviations) and hence optimum soldering quality.

Optimum soldering quality is also achieved because the terminals are interposed between the laser beam and the coil and are therefore struck precisely in such a way that the coil is not damaged.

BRIEF DESCRIPTION OF THE DRAWINGS

Further features and advantages of the invention are more apparent from the following exemplary and therefore non-limiting description of a preferred and hence non-exclusive embodiment of a method and a device for laser soldering an electric circuit of a heating portion of an electronic cigarette.

The invention is described below with reference to the accompanying drawings, which illustrate a non-limiting embodiment of it and in which:

FIG. 4 shows a schematic cross section of a detail from FIGS. 2 and 3.

DESCRIPTION OF THE PREFERRED EMBODIMENTS

Figure 1:
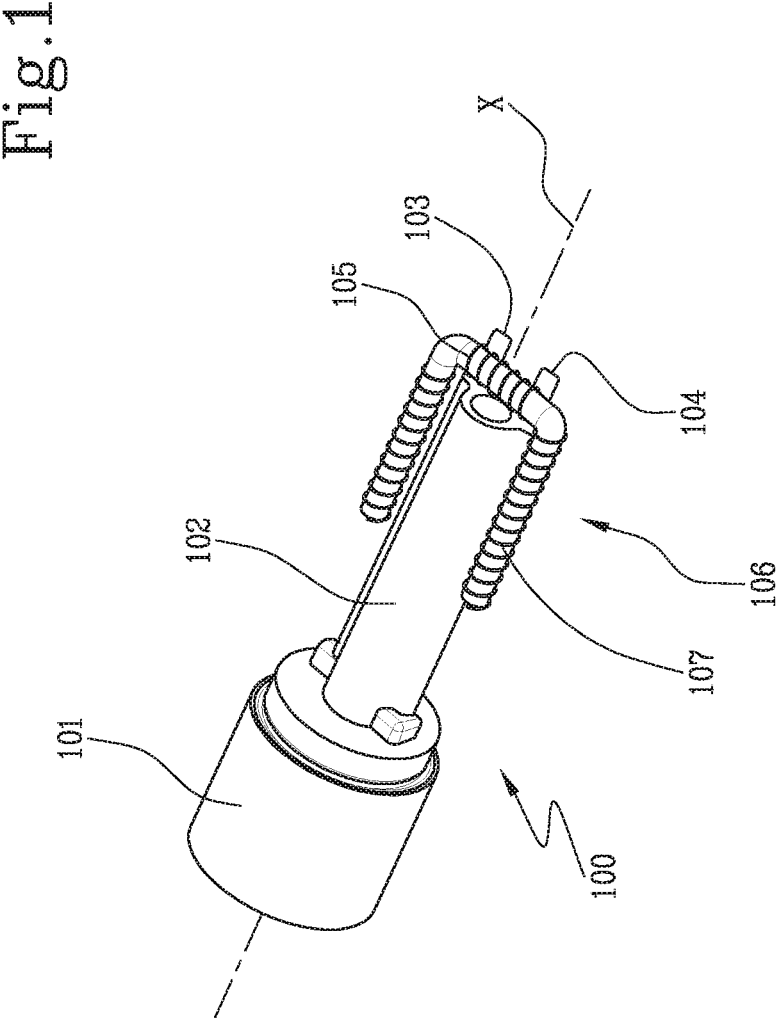
FIG. 1 shows a schematic perspective view of a heating portion of an electronic cigarette.

With reference to FIG. 1, the numeral 100 denotes in its entirety a heating portion of an electronic cigarette.

The heating portion 100 is adapted to be fitted inside a housing defining the electronic cigarette and comprises a supporting element 101, for example cylindrical, from which there projects, for example in an axial direction, an element 102, for example tubular, for supporting two terminals 103 and 104.

The two terminals 103 and 104 are mounted parallel to, and laterally of, the element 102 itself. The two terminals 103 and 104 converge in the supporting element 101 and are adapted to be powered by an energy source, for example a battery, located in the electronic cigarette.

The numeral 105 denotes a coil which is soldered to the terminal 103 at a first connection and to the terminal 104 at a second connection.

The two terminals 103 and 104 and the coil 105 form an electric circuit 106 of the heating portion 100 of the electronic cigarette.

The first and second solder connections are located respectively at a first and second point of the electric circuit 106.

The numeral 107 denotes an aromatic component of the electronic cigarette, made in such a way as to contain and/or retain an aromatic substance which evaporates when subjected to the heat produced as a result of the Joule effect when an electric current flows through the electric circuit.

Figure 2:
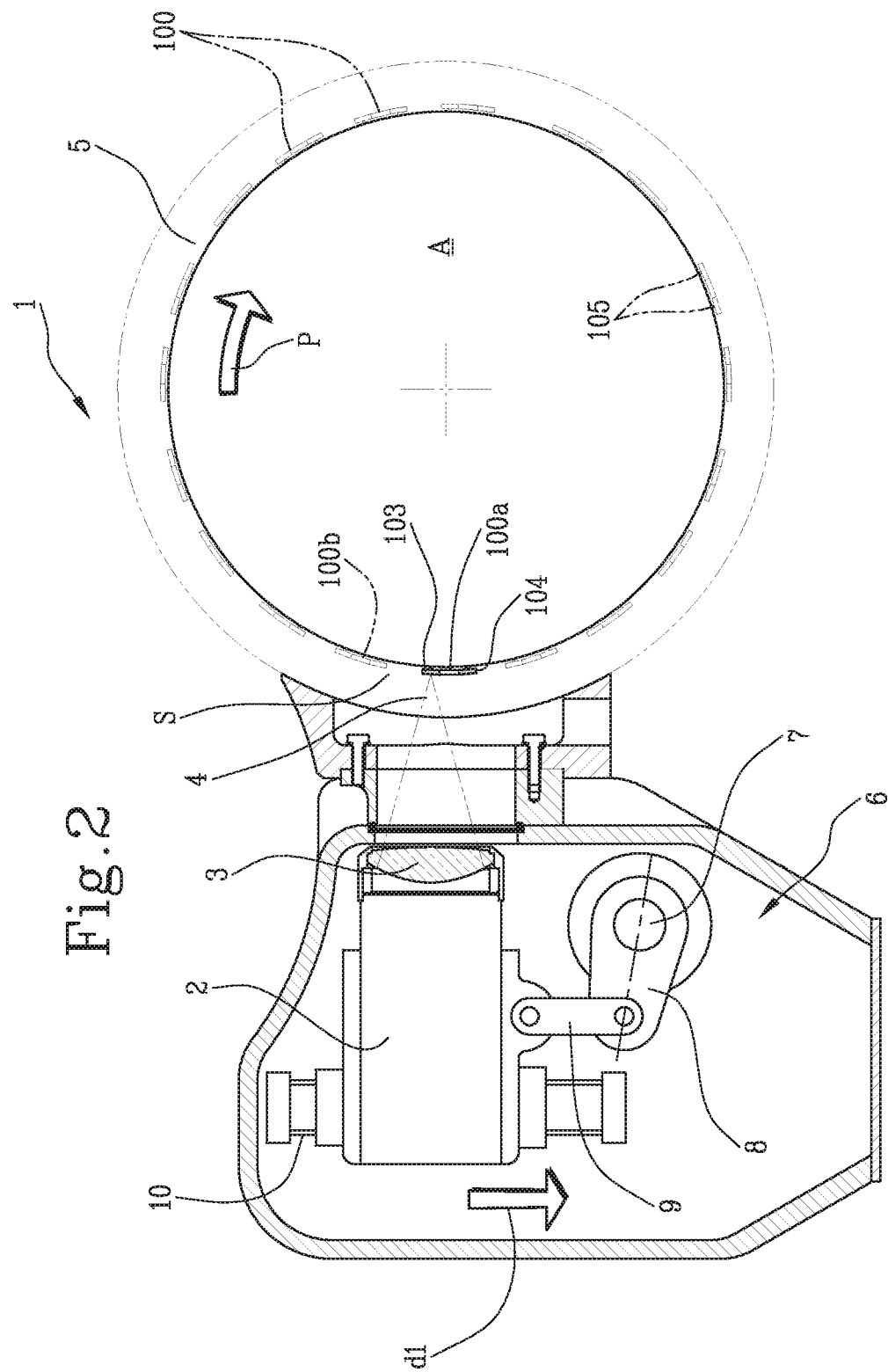
FIGS. 2 and 3 are schematic cross sections of a laser soldering device according to this invention in two different operating positions, mounted inside a machine which makes electronic cigarettes and of which a drum or wheel for feeding or transferring the heating portions is shown.
Figure 3:
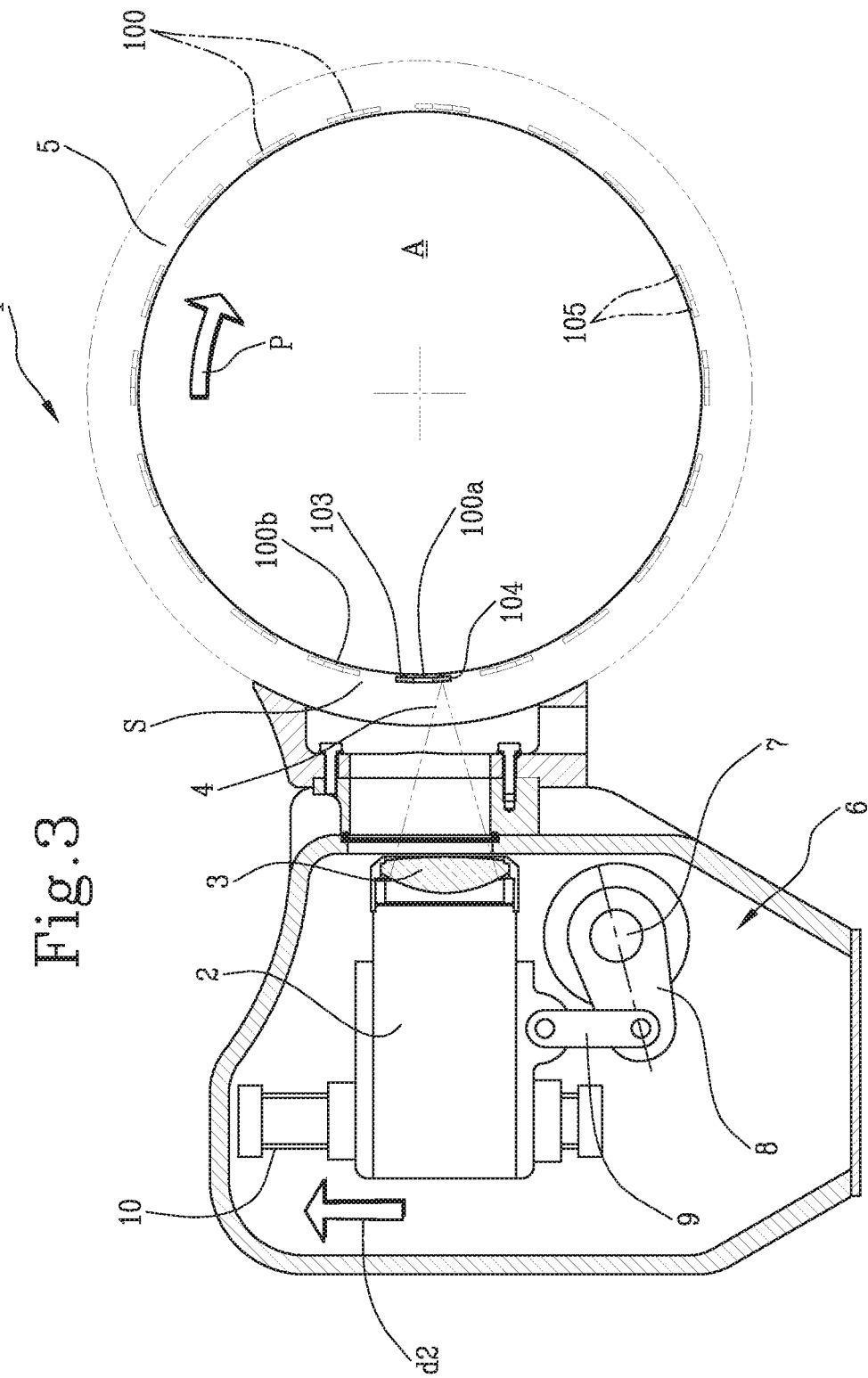

The configuration of the heating portion is such that the heating portion extends along a main direction "X" substantially parallel to the length of the terminals 103, 104 and/or of the element 102, FIGS. 2 and 3 illustrate the laser soldering device 1 of the electric circuit 107 in two different positions.

The laser soldering device 1 comprises a laser soldering head 2 having an emitting area 3 where a laser beam 4 is emitted. The laser soldering head 2 comprises means for generating two distinct pulses of the laser beam. More specifically, the two pulses which generate the laser beams are triggered by a single activation trigger.

The numeral 5 denotes a feeding device configured to feed a heating portion 100 of an electronic cigarette along a feed path "P" at least as far as a soldering position "S", where the heating portion 100 faces the laser soldering head 2 at the emitting area 3.

Preferably, the feeding device 5 comprises a feeding drum adapted to receive and retain the heating portions on a radially outer surface of it. Still more preferably, the feeding drum is adapted to retain the heating portions 100 in such a way that the terminals 103, 104 are directed outwards and the coil 105 is interposed between the terminals themselves and the centre of the feeding drum.

In the embodiment illustrated, the feeding drum rotates about a horizontal axis "A" and is adapted to retain the heating portions in such a way that the main direction "X" is tangent to the feeding drum and parallel to the axis "A".

In FIGS. 2 and 3, the heating portions 100 are illustrated schematically with the two terminals 103 and 104 and the coil 105 shown in cross section.

In one possible embodiment, the feeding device 5, preferably the feeding drum, is configured to feed the heating portions intermittently, stopping for a predetermined length of time at the soldering position "S".

The laser soldering device 1 comprises movement means 6 operatively connected to the laser soldering head 2 and configured to move the laser soldering head 2 in such a way as to make the aforementioned solder connections spaced from each other.

Preferably, the movement means 6 comprise a motor, not illustrated, having keyed to its output shaft 7 a lever 8 which rotates about an axis perpendicular to the sheet of FIG. 2 or 3, alternately in both directions.

The numeral 9 denotes a con rod for connection to the laser soldering head 2 and interposed between the lever 8 and the laser soldering head 2.

The numeral 10 denotes a straight guide along which the laser soldering head 2 can slide under the action of the con rod 9.

The movement means 6 are adapted to move the laser soldering head 2 between the first point and the second point of the electric circuit 106 in such a way as to position the laser beam 4 perpendicularly to the respective surface to be soldered at the first and second points of the electric circuit 106 to form the first and second connections, respectively. The laser soldering head generates two distinct pulses of the laser beam at the first and the second point.

In the example illustrated, the movement means 6 are configured to move the laser soldering head 2 by translation, for example vertically. Preferably, the movement means are configured to move the laser soldering head at a constant speed.

In use, the soldering device 1 is suitable for implementing a method for laser soldering an electric circuit 106 of a heating portion 100 of an electronic cigarette according to this invention.

More specifically, this soldering method comprises feeding a heating portion 100 of an electronic cigarette along a feed path "P" at least as far as a soldering position "S", where the heating portion "100" faces a laser soldering head 2 at an emitting area 3 where a laser beam 4 is emitted.

This is followed by a step of making a first laser solder at a first point of the electric circuit by striking the first point with the laser beam to produce a first solder connection. During the first laser soldering step, the laser beam is perpendicular to the surface to be soldered. More specifically, the first point is located at the terminal 103 and at the coil 105 to form the first connection and the second point is located at the terminal 104 and at the coil 105 to form the second connection.

After the first laser soldering step, the laser soldering head 2 is moved between the first point and a second point of the electric circuit 106 in such a way that the laser beam 4 is perpendicular to the surface to be soldered during a second laser soldering step which is carried out on the second point by striking the second point with the laser beam to produce a second solder connection, spaced from the first solder connection.

The first laser soldering step and the second laser soldering step are carried out by generating two distinct pulses of the laser beam.

During the first and the second laser soldering steps, the laser beam strikes the first point and the second point perpendicularly. More specifically, the two terminals are struck directly by the laser beam and are thus respectively interposed between the laser beam and the coil.

Preferably, the laser soldering head 2 is moved by translation, for example vertically, and still more preferably, the laser soldering head 2 is moved at a constant speed.

In a possible embodiment, the heating portion 100 remains stationary at the soldering position "S" while the laser soldering head 2 is moved between the first and the second point.

In use, a plurality of heating portions 100 are fed in sequence along the feed path "P" in such a way that each heating portion 100 reaches the same soldering position "S" in sequence. The first laser soldering step, the step of moving the laser soldering head and the second laser soldering step are repeated on each heating portion 100 located at the soldering position.

Preferably, the laser soldering head 2 is moved only once for each heating portion 100. Still more preferably, the laser soldering head 2 performs a forward stroke d1) when soldering a first heating portion and a return stroke d2) when soldering a second heating portion immediately after the first heating portion. For clarity, the references 100a and 100b denote the first heating portion and the second heating portion immediately following the first heating portion.

In particular, FIG. 1 illustrates the moment the first heating portion 100a reaches the soldering position "S" with the two terminals tangential to the feeding drum and parallel to the axis "A". Preferably, the two terminals 103, 104 are positioned horizontally.

The laser soldering head 2 is at a raised position in which the laser beam 4 strikes the terminal 103. The coil 105 is directed towards the centre of the feeding drum. After the first pulse which generates the first laser beam to perform the first soldering step, thus making the first connection, the laser soldering head 2 is lowered in such a way that the laser beam can strike the terminal 104 as illustrated, for example, in FIG. 3. In other words, the laser soldering head 2 performs the forward stroke d1). Another pulse generates another laser beam which directly strikes the terminal 104, thus making the second connection.

Next, the feeding drum is set in rotation so as to bring the second heating portion 100b, following the first, to the soldering position "S".

The laser soldering head 2 remains at the lowered position in which the laser beam 4 strikes the terminal 104. Next, the laser soldering head 2 is raised so that the laser beam can strike the terminal 103. In other words, the laser soldering head 2 performs the return stroke d2). Another pulse generates another laser beam which directly strikes the terminal 103.

For the heating portions coming after that, the steps described with reference to FIGS. 2 and 3 are repeated.

The device and method described can be used to solder two points of an electric circuit of a heating portion of an electronic cigarette. In particular, the invention allows soldering the coil to the terminals of the electric circuit.

The movement of the laser soldering head (preferably at a constant speed) allows obtaining laser beams perpendicular to the surfaces to be soldered, and hence high quality solders.

The heating portions are retained by the feeding drum with intermittent rotary motion. The solder is made by directing the laser beam horizontally when the feeding drum stops and by moving the laser soldering head, for example vertically, in such a way as to create the same soldering condition on all the surfaces.

The device according to this invention can be implemented in a machine for assembling electronic cigarettes where soldering is checked by measuring the resistance of the entire electric circuit.

Moreover, the laser beam perpendicularly strikes the first and second terminals which are respectively interposed between the laser beam and the coil, thus avoiding damage to the coil.

What is claimed is:

1. A method for laser soldering an electric circuit of a heating portion of an electronic cigarette, the method comprising the following steps:
    a) feeding a heating portion of an electronic cigarette along a feed path at least as far as a soldering position, where the heating portion faces a laser soldering head at an emitting area where a laser beam is emitted, wherein the heating portion comprises a coil,
    b) making a first laser solder at a first point between the coil and a first terminal by striking the first point with the laser beam to produce a first solder connection between the coil and the first terminal,
    c) making a second laser solder at a second point between the coil and a second terminal by striking the second point with the laser beam to produce a second solder connection between the coil and the second terminal, the second solder connection being spaced from the first solder connection, wherein the first terminal and the second terminal are adapted to powered by an energy source, the first terminal and the second terminal and the coil forming an electric circuit of the heating portion of the electronic cigarette powered by the energy source,
    wherein during step b), the laser beam is perpendicular to a surface to be soldered,
    between step b) and step c), a step d) of moving the laser soldering head between the first point and the second point such that the laser beam is perpendicular to the surface to be soldered during step c),
    wherein step b) and step c) are carried out by generating two distinct pulses of the laser beam.

2. The method according to claim 1, wherein during step d), the laser soldering head is moved by translation.

3. The method according to claim 1, wherein during step d), the laser soldering head is moved at a constant speed.

4. The method according to claim 1, wherein the heating portion remains stationary at the soldering position while the laser soldering head is moved between the first point and the second point.

5. The method according to claim 1, and further comprising feeding in sequence a plurality of heating portions along the feed path such that each heating portion reaches the same soldering position in sequence and by repeating steps b), d) and c) for each heating portion located at the soldering position.

6. The method according to claim 5, wherein the laser soldering head is moved according to the movement of step d) only once for each heating portion and the laser soldering head performs a forward stroke when soldering a first heating portion and a return stroke when soldering a second heating portion immediately after the first heating portion.

7. The method according to claim 1, wherein the laser beam perpendicularly strikes the first terminal and the second terminal which are respectively interposed between the laser beam and the coil.

8. The method according to claim 1, wherein the two distinct pulses which generate the laser beams are triggered by a single activation trigger.

9. The method according to claim 1, wherein during step d), the laser soldering head is moved vertically by translation.

10. A method for laser soldering an electric circuit of a heating portion of an electronic cigarette, the method comprising the following steps:
    a) feeding a heating portion of an electronic cigarette along a feed path at least as far as a soldering position, where the heating portion faces a laser soldering head at an emitting area where a laser beam is emitted, the heating portion comprising a coil,
    b) making a first laser solder at a first point between the coil and a first terminal by striking the first point with the laser beam to produce a first solder connection between the first terminal and the coil,
    c) making a second laser solder at a second point between the coil and a second terminal by striking the second point with the laser beam to produce a second solder connection between the second terminal and the coil, the second solder connection being spaced from the first solder connection, wherein the first and second terminals are adapted to be powered by an energy source, the first and second terminals and the coil forming an electric circuit of the heating portion of the electronic cigarette powered by the energy source,
    wherein during steps b) and c), the laser beam perpendicularly strikes the first terminal and the second terminal which are respectively interposed between the laser beam and the coil.

* * * * *